United States Patent
L'Heureux et al.

(10) Patent No.: US 9,506,838 B2
(45) Date of Patent: *Nov. 29, 2016

(54) BI-DIRECTIONAL MULTI-PULSEWIDTH OPTICAL TIME-DOMAIN REFLECTOMETER

(71) Applicant: EXFO INC., Quebec (CA)

(72) Inventors: Mario L'Heureux, Saint-Nicolas (CA); Michel Leclerc, Quebec (CA); Eric Thomassin, Quebec (CA); Stephane Perron, Levis (CA)

(73) Assignee: EXFO Inc., Quebec (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/820,707

(22) Filed: Aug. 7, 2015

(65) Prior Publication Data

US 2015/0346054 A1 Dec. 3, 2015

Related U.S. Application Data

(63) Continuation of application No. 14/014,606, filed on Aug. 30, 2013, now Pat. No. 9,134,197.

(60) Provisional application No. 61/752,554, filed on Jan. 15, 2013.

(51) Int. Cl.
  *G01N 21/00* (2006.01)
  *G01M 11/00* (2006.01)

(52) U.S. Cl.
  CPC ..... *G01M 11/3145* (2013.01); *G01M 11/3109* (2013.01); *G01M 11/3118* (2013.01); *G01M 11/39* (2013.01)

(58) Field of Classification Search
  CPC ........... G01M 11/39; G01M 11/3109; G01M 11/3118; G01M 11/3145
  See application file for complete search history.

(56) References Cited

U.S. PATENT DOCUMENTS 5,155,439 A 10/1992 Holmbo et al.
5,528,356 A 6/1996 Harcourt
(Continued)

FOREIGN PATENT DOCUMENTS

WO 2011147030 12/2011

OTHER PUBLICATIONS

J.A.Nagel et al., "Determination of Localized Loss in Cabled Fiber Using OTDR Measurements of Relative Mode Field Diameter", Proceedings of OFC/NFOEC, NWC3, 2010.
(Continued)

*Primary Examiner* — Michael P Stafira
(74) *Attorney, Agent, or Firm* — Helene Chotard

(57) ABSTRACT

There is provided a bi-directional optical reflectometric method for characterizing an optical fiber link. The method comprises: performing at least one forward-direction light acquisition from one end of the optical fiber link and performing at least one backward-direction light acquisition from the opposite end, wherein each light acquisition is performed by propagating at least one test light signal corresponding to given spatial resolution and detecting corresponding return light so as to obtain a reflectometric trace representing backscattered and reflected light as a function of a distance on the optical fiber link, and wherein said forward-direction light acquisition and said backward-direction light acquisition are performed with mutually different spatial resolutions; and deriving a value of at least one parameter characterizing an event at a location along said optical fiber link at least using the forward-direction light acquisition and the backward-direction light acquisition performed with mutually different spatial resolutions.

17 Claims, 6 Drawing Sheets

(56) References Cited

U.S. PATENT DOCUMENTS

| | | | |
|---|---|---|---|
| 5,754,284 | A | 5/1998 | Leblanc |
| 6,445,445 | B1 | 9/2002 | Nakayama et al. |
| 7,515,276 | B2 | 4/2009 | Froggatt et al. |
| 7,620,513 | B2 | 11/2009 | Nakayama et al. |
| 9,134,197 | B2 * | 9/2015 | L'Heureux et al. ............. G01M 11/3118 |
| 2004/0047629 | A1 | 3/2004 | Evangelides, Jr. et al. |
| 2006/0244949 | A1 | 11/2006 | Chen et al. |
| 2011/0149270 | A1 | 6/2011 | Nagel et al. |
| 2012/0045205 | A1 | 2/2012 | Perron |
| 2013/0088718 | A1 | 4/2013 | Perron et al. |
| 2013/0155391 | A1 | 6/2013 | Achten |

OTHER PUBLICATIONS

JDS Uniphase Corporation, "JDSU's MTS/T-BERD platforms: Fully automated bi-directional OTDR data acquisition and data analysis test instruments", Application Note, 2006.

JDS Uniphase Corporation, "FiberCable OFS-200—Pushing the frontier of OTDR acceptance reporting", Application Note, 2006.

Park et al. "Coded Optical Time Domain Reflectometry: Principles and Applications", Proc. of SPIE vol. 6781, 678129, 2007.

EXFO Inc. "Bidirectional OTDR Testing: Multimode vs. Singlemode fibers", Application Note 043, 2006.

\* cited by examiner

302 — X → Y

| Δt (ns) | XY Location (m) | IL (dB) | Refl. (dB) |
|---|---|---|---|
| 10 | 0 | 0.5 | -55 |
| 10 | 5 000 | 0.75 | n/a |
| 10 | 5 100 | 0.75 | n/a |
| 100 | 21 000 | 1.0 | -28 |
| 1000 | 31 100 | 2 | n/a |
| 1000 | 54 000 | 1.0 | n/a |
| 1000 | 60 000 | 0.5 | -55 |

304 — Y → X

| Δt (ns) | YX Location (m) | IL (dB) | Refl. (dB) |
|---|---|---|---|
| 10 | 0 | 0.5 | -55 |
| 10 | 6 000 | 0.5 | n/a |
| 10 | 6 100 | 0.5 | n/a |
| 100 | 17 000 | 0.4 | n/a |
| 1000 | 19 000 | 3 | -29 |
| 1000 | 29 000 | -0.5 | n/a |
| 1000 | 45 000 | 1.5 | n/a |
| 1000 | 60 000 | 0.5 | -55 |

306 — X → Y

| Δt (ns) | XY Location (m) | IL (dB) | Refl. (dB) |
|---|---|---|---|
| 10 | 0 | 0.5 | -55 |
| 10 | 5 000 | 0.5 | n/a |
| 10 | 5 100 | 0.5 | n/a |
| 100 | 21 000 | 1.0 | n/a |
| 1000 | 31 100 | 2 | -28 |
| 1000 | 54 000 | 1.0 | n/a |
| 1000 | 60 000 | 0.5 | -55 |

308 — Y → X

| Δt (ns) | XY Location (m) | IL (dB) | Refl. (dB) |
|---|---|---|---|
| 1000 | 0 | 0.5 | -55 |
| 1000 | 5 000 | 1.5 | n/a |
| 1000 | 21 000 | -0.5 | n/a |
| 100 | 31 000 | 3 | -29 |
| 10 | 43 000 | 0.4 | n/a |
| 10 | 53 900 | 0.5 | n/a |
| 10 | 54 000 | 0.5 | n/a |
| 10 | 60 000 | 0.5 | -55 |

*Fig. 3A*

Table 310:

| Δt (ns) | XY Location (m) | IL (dB) | Refl. (dB) | YX Location (m) | Δt (ns) | IL (dB) | Refl. (dB) |
|---|---|---|---|---|---|---|---|
| | | X → Y | | | | Y → X | |
| 10 | 0 | 0.5 | -55 | 0 | 1000 | 0.5 | -55 |
| 10 | 5 000 | 0.5 | n/a | 5 000 | 1000 | 1.5 | n/a |
| 10 | 5 100 | 0.5 | n/a | 21 000 | 1000 | -0.5 | n/a |
| 100 | 21 000 | 1.0 | n/a | 31 000 | 100 | 3 | -29 |
| 1000 | 31 100 | 2 | -28 | 43 000 | 10 | 0.4 | n/a |
| 1000 | 54 000 | 1.0 | n/a | 53 900 | 10 | 0.5 | n/a |
| 1000 | 60 000 | 0.5 | -55 | 54 000 | 10 | 0.5 | n/a |
| | | | | 60 000 | 10 | 0.5 | -55 |

↓

Table 312:

| Δt (ns) | XY Location (m) | IL (dB) | Refl. (dB) | YX Location (m) | Δt (ns) | IL (dB) | Refl. (dB) |
|---|---|---|---|---|---|---|---|
| | | X → Y | | | | Y → X | |
| 10 | 0 | 0.5 | -55 | 0 | 1000 | 0.5 | -55 |
| 10 | 5 000 | 0.5 | n/a | 5 000 | 1000 | 1.5 | n/a |
| 10 | 5 100 | 0.5 | n/a | 21 000 | 1000 | -0.5 | n/a |
| 100 | 21 000 | 1.0 | n/a | 31 000 | 100 | 3 | -29 |
| 1000 | 31 100 | 2 | -28 | 43 000 | 10 | 0.5 | n/a |
| 1000 | 43 000 | 0.01 | n/a | 53 900 | 10 | 0.5 | n/a |
| 1000 | 54 000 | 1.0 | n/a | 54 000 | 10 | 0.5 | n/a |
| 1000 | 60 000 | 0.5 | -55 | 60 000 | 10 | 0.5 | -55 |

Table 314 — BIDIR:

| XY Location (m) | IL Bidir (dB) | Refl. Bidir (dB) |
|---|---|---|
| 0 | 0.5 | -55 |
| 5 000 | 1.25 | n/a |
| 5 100 | | |
| 21 000 | 0.25 | n/a |
| 31 000 | 2.5 | -28 |
| 43 000 | 0.26 | n/a |
| 43 900 | 1.0 | n/a |
| 44 000 | | |
| 50 000 | 0.5 | -55 |

*Fig. 3B*

BI-DIRECTIONAL MULTI-PULSEWIDTH OPTICAL TIME-DOMAIN REFLECTOMETER

CROSS-REFERENCE TO RELATED APPLICATIONS

This application is a continuation of U.S. patent application Ser. No. 14/014,606 filed Aug. 30, 2013, now pending, and claiming priority under 35USC §119(e) of U.S. provisional patent application 61/752,554 filed Jan. 15, 2013; the specifications of which are hereby incorporated by reference.

TECHNICAL FIELD

The invention relates to the field of optical reflectometric methods and systems, and more specifically to bi-directional Optical Time-Domain Reflectometric (OTDR) methods and systems used to characterize optical fiber links.

BACKGROUND OF THE ART

Optical reflectometric methods are widely employed for characterization of optical fiber links. Among these methods, the most commonly used approach is Optical Time-Domain Reflectometry (OTDR—also used to refer to the corresponding device), a diagnostic technique where light pulses are launched in an optical fiber link and the returning light, arising from backscattering and reflections along the fiber link, is detected and analyzed. Various "events" along the fiber link can be detected and characterized through a proper analysis of the returning light in the time domain.

Nowadays, most OTDRs on the market provide an automatic mode, where the instrument automatically chooses an appropriate pulse duration (also referred to as "pulsewidth") and acquisition range (see, for example, the FTB-720 commercialized by EXFO or the OptiFiber™ Pro OTDR commercialized by Fluke Networks). In order to choose the appropriate settings for the final acquisition, the instrument launches one or many brief "investigation acquisitions", which provide a quick overview of the link being tested. In general, the investigation acquisitions are hidden from the user, and only the final acquisition is made available.

For both manual settings and automatic settings, the final result is an OTDR trace performed with pulses having a common duration. In general, a given pulsewidth will be selected to allow characterization of the complete link. For example, a link having large loss requires testing with a long pulse. However, the use of a long pulse brings certain limitations in the ability to characterize short fiber sections, as well as closely spaced events.

An improvement to the single-pulsewidth approach has been developed, whereby the equipment makes use of multiple acquisitions performed with different pulsewidths. Such an approach is the basis of the Intellitrace Plus™ technology by Tektronix (http://www.tek.com, see also U.S. Pat. No. 5,155,439 (HOLMBO et al) and U.S. Pat. No. 5,528,356 (HARCOURT)) and of the Intelligent Optical Link Mapper (iOLM) technology by EXFO (see U.S. patent publication no. US 2013/0088718 A1 (PERRON et al), commonly owned by the Applicant and of which the specification is hereby incorporated by reference). In the above multiple-pulsewidth approaches, shorter pulses are used to characterize the most proximal portion, i.e. the portion closest to the OTDR, of the link under test with a better resolution, while longer pulses provide for more signal power to characterize portions of the optical link that are farther away but with a drawback on resolution. The above-described multiple-pulsewidth approaches therefore offer significant improvement to the traditional single-pulsewidth approach, as each event can be characterized by an "optimum" pulsewidth. In addition, in the iOLM approach by EXFO, each parameter of an event can be individually characterized using the "optimum" pulsewidth. For example, a first acquisition performed with one pulsewidth may be used to characterize the event location while a second acquisition performed with another pulsewidth may be used to characterize the insertion loss or the reflectance associated with the event. However, all the above-mentioned multiple-pulsewidth approaches are limited to single-ended measurements.

A problem with single-end OTDR measurements is the characterization of splice loss in cases where the link under test includes multiple fiber types. Differences in mode field diameter (MFD) corresponding to respective different concatenated optical fiber types in a link may lead to different degrees of backscattered light in response to OTDR test pulses. As a consequence, MFD mismatch between spliced fibers may cause an apparent "gain" or a drop in the backscattered light of OTDR measurements, which is not related to the real loss at the point of concatenation (e.g. at a fiber splice). For example, a fiber splice may appear as a gain in the backscattered light due to MFD mismatch between the spliced fibers. An OTDR measurement performed from the opposite end on the same fiber splice would conversely result in an overestimation of the splice loss. For this reason, single-end OTDR measurements do not allow for proper characterization of such events. The Telecommunications Industry Association (TIA) therefore recommends the use of bi-directional OTDR analysis to average the results of single-ended OTDR measurements and properly characterize multi-fiber links (test procedure EIA/TIA FOTP-61 "Measurement of Fiber or Cable Attenuation Using an OTDR").

In accordance with bi-directional OTDR analysis of multi-fiber optical links, a single-end single-pulsewidth OTDR measurement is performed in each direction of the link under test, i.e. one measurement from each end. The information obtained from the two measurements is combined to characterize events identified along the link. In order to do this, the single-ended OTDR traces need to be matched in position along the link. The match is generally based on the position of multiple events appearing on the OTDR traces. Accordingly, each single-ended measurement is required to cover the entire link with an acceptable Signal-to-Noise Ratio (SNR) and consequently a proper pulsewidth of the test pulses should be selected to fulfill this requirement. The same pulsewidth is hence used to characterize the entire link. The spatial resolution of the OTDR measurement is therefore limited by this constraint and high-resolution bi-directional OTDR measurements are not possible.

There is therefore a need for bi-directional OTDRs allowing a better resolution at least for portions of the link under test close to the extremities thereof.

SUMMARY

There is therefore provided a bi-directional Optical Time-Domain Reflectometric (OTDR) method and system for characterizing optical links using a bi-directional OTDR analysis which allows characterization of distinct events in the link with different pulsewidths. The provided method and system benefit from both multi-pulsewidth acquisition and bi-directional analysis. Events are identified along the fiber link using single-end multi-pulsewidth acquisitions in which longer pulses enable identification of more distant events and shorter pulses provide improved resolution for more proximate events. The single-end measurements performed from respective ends of the fiber link are then correlated together using the identified events. The individual characterization of each event with its specific pulsewidth, as selected separately for the acquisitions performed from the one end (forward-direction) and the acquisitions performed from the opposite end (backward-direction), results in improved resolution for events located closer to both ends of the link.

In accordance with one aspect, there is provided a bi-directional OTDR method and system for characterizing an optical fiber link wherein OTDR measurements are performed with multi-pulsewidth acquisitions for both the forward-direction and the backward-direction. For each direction, events along the fiber optic link under test are identified and at least values of a location parameter characterizing the events are extracted from a proper analysis of the multi-pulsewidth OTDR measurements. A list of the identified events, which includes values of the location parameter, is then generated for each of the forward and the backward directions. It is these lists of events that are used to match the forward and backward multi-pulsewidth OTDR measurements. For each direction, each event of the list of events is characterized with the optimal pulsewidth which, for a given matched event, may not be the same in the forward and the backward directions. A bi-directional characterization may then be derived based on a combination of the forward and backward characterizations. Accordingly, values of parameters characterizing a matched event may be derived using a forward-direction light acquisition and a backward-direction light acquisition performed with mutually different pulsewidths.

In accordance with one aspect, there is provided a bi-directional optical reflectometric method for characterizing an optical fiber link. The method comprises:

performing at least one forward-direction light acquisition from one end of the optical fiber link and performing at least one backward-direction light acquisition from the opposite end of the optical fiber link, wherein each light acquisition is performed by propagating in the optical fiber link from the corresponding end, at least one test light signal corresponding to a given spatial resolution in the optical fiber link and detecting corresponding return light from the optical fiber link so as to obtain a reflectometric trace representing backscattered and reflected light as a function of distance on the optical fiber link, and wherein said forward-direction light acquisition and said backward-direction light acquisition are performed with mutually different spatial resolutions; and deriving a value of at least one parameter characterizing an event at a location along said optical fiber link at least using the forward-direction light acquisition and the backward-direction light acquisition performed with mutually different spatial resolutions.

In accordance with a further aspect, each said light acquisition is an Optical Time-Domain Reflectometric (OTDR) light acquisition for which said test light signal comprises at least one test light pulse of a given pulsewidth. The pulsewidths corresponding to said forward-direction light acquisition and to said backward-direction light acquisition are mutually different and said forward-direction light acquisition and said backward-direction light acquisition used for said deriving a value of at least one parameter are thereby performed with mutually different pulsewidths.

This combination of multi-pulsewidth acquisitions and bi-directional analysis provides for an optimal resolution to be used for characterizing location of events at both ends of the fiber link under test, which is normally not possible with either single-ended multi-pulsewidth acquisitions or conventional bi-directional OTDR analysis. Accordingly, compared with conventional bi-directional OTDR analysis, the provided multi-pulsewidth bi-directional OTDR analysis provides for better characterization of splice loss without compromising the resolution. It even allows high resolution characterization of both the proximal and the distal portions of the optical link.

The resulting higher resolution in proximity of both extremities of the optical link allows for better characterization of closely spaced events. With the higher resolution, closely spaced events are more easily discriminated from one another. This provides a more accurate event count compared to either a conventional bi-directional OTDR analysis or a single-ended multi-pulsewidth OTDR analysis for which closely spaced events are often not properly discriminated, thereby preventing application of reliable pass/fail criteria on those events. For example, insertion loss pass/fail thresholds normally apply to single events. When two or more events appear merged due to insufficient resolution, the pass/fail criterion for insertion loss may wrongly indicate an insertion loss that is above the threshold for the merged events, whereas each individual event would have shown insertion loss below the threshold. Better resolution thus provides for more reliable application of the pass/fail criteria.

The provided bi-directional OTDR method may be employed advantageously for bi-directional characterization of loss when the parameter or parameters characterizing the event comprise a loss parameter. In one embodiment, a plurality of forward-direction light acquisitions is performed with mutually different spatial resolutions and a plurality of backward-direction light acquisitions is performed also with mutually different spatial resolutions.

In this case, one of the forward-direction light acquisitions may be selected for deriving the loss parameter based on quality factors associated with the loss parameter for each of the forward-direction light acquisitions. Similarly, one of the backward-direction light acquisitions may be selected for deriving the loss parameter based on quality factors associated with the loss parameter for each of the backward-direction light acquisitions. The loss parameter may then be computed based on the selected forward-direction and backward-direction light acquisitions using, for example, the average drop of backscattered light between the selected forward-direction and backward-direction light acquisitions.

In accordance with a further aspect, when an event is identified in light acquisitions taken from one end of the optical fiber link but is not discernible in light acquisitions taken from the opposite end, a consolidation of the forward- and backward-direction acquisitions allows for better characterization of the event. A value of a loss parameter may be computed for this event based on return light from selected both forward- and backward-direction acquisitions, even though the event might only be revealed from acquisitions taken from one of the two ends.

In other words, when a given event is identified in light acquisitions taken from a first end but not in light acquisitions taken from a second end, a characterization of the insertion loss parameter for this event may be forced in the analysis of the light acquisitions from the second end (where it is missing) based on the value of its location parameter as characterized from the first end. This provides for a bi-directional characterization of the insertion loss associated with this event even if the event is not identified in lights acquisitions taken from one of the two ends of the optical link under test.

In accordance with another further aspect, a plurality of light acquisitions may be performed with respective test light pulses having mutually different wavelengths.

In this case, when an event is identified in light acquisitions performed at a first wavelength but is not apparent in light acquisitions performed at a second wavelength, a consolidation of the acquisitions performed at all wavelengths allows for characterization of the event at the second wavelength even if it was not initially identified at this wavelength. Values of parameters characterizing the event may be derived using return light from acquisitions performed at the second wavelength, based on the location parameter as characterized at the first wavelength.

In accordance with another aspect, there is provided a link element view for graphically representing the results of a bi-directional OTDR method on an optical fiber link having a first and a second end. The link element view comprises:
  a plurality of element boxes each associated with an event along said optical fiber link and each graphically represented one of a number of visually-distinct predefined icons; and
  wherein at least one of said element boxes comprises a value of at least one bi-directional parameter characterizing its associated event at least using a forward-direction light acquisition performed from the first end of the optical fiber link and a backward-direction light acquisition performed from the second end of the optical fiber link.

In accordance with yet another aspect, there is provided a bi-directional OTDR method for characterizing an optical fiber link having a first and a second end. The method comprises:
  performing at least one forward-direction light acquisition from a first end of the optical fiber link and performing at least one backward-direction light acquisition from a second end of the optical fiber link, wherein each light acquisition is performed by propagating in the optical fiber link from the corresponding end, at least one test light pulse of a given pulsewidth and detecting corresponding return light from the optical fiber link so as to obtain a reflectometric trace representing backscattered and reflected light as a function of a distance on the optical fiber link, and
  identifying events in said optical fiber link from return light of the forward-direction light acquisition to create a list of events wherein each event of said list is characterized at least by a location along said optical fiber link;
  identifying events in said optical fiber link from return light of the backward-direction light acquisition to create a list of events wherein each event of said list is characterized at least by a location along said optical fiber link;
  matching location of events in the forward-direction list with location of events in the backward-direction list to create a consolidated list of events comprising events of said forward-direction and said backward-direction list; and
  defining a plurality of element boxes each associated with one of said events of said consolidated list of events and each graphically represented as an icon selected from a number of visually-distinct predefined icons.

In accordance with still yet another aspect, there is provided a bi-directional optical reflectometric system for characterizing at least one event in an optical fiber link. The system comprises:
  an acquisition module for performing a plurality of light acquisitions from one end of the optical fiber link and comprising a light generating assembly to be coupled to the optical fiber link for generating and propagating in the optical fiber link a test light signal corresponding to a given spatial resolution, and a detection module for detecting corresponding return light from the optical fiber link so as to obtain a reflectometric trace representing backscattered and reflected light as a function of a distance on the optical fiber link, wherein said plurality of light acquisitions are performed with mutually different spatial resolutions; and
  an analyzing module for analyzing the detected return light signals and deriving a value of at least one parameter characterizing an event along said optical fiber link at least using one of said light acquisitions performed with a first spatial resolution and another light acquisition obtained from the opposite end of the optical fiber link and performed with a second spatial resolution, different from said first spatial resolution.

Throughout this specification reference is made to optical reflectometric technology and more specifically to OTDR technology. It is noted that optical reflectometric technology is herein meant to encompass all variations of optical reflectometric technology to which the provided method and system may equivalently apply. Examples of such variations include Optical Frequency Domain Reflectometry (OFDR) (e.g., see U.S. Pat. No. 7,515,276 to FROGGATT et al), and coded OTDR technology (see Park et al. "Coded optical time domain reflectometry: principle and applications", Proc. of SPIE Vol. 6781, 678129 (2007)) also referred to as correlation OTDR. Other variations are also meant to be encompassed. In the case of conventional OTDR, measurements corresponding to different spatial resolutions may be obtained by varying the pulsewidth of the test light pulses, whereas in the case of OFDR, different spatial resolutions may be obtained by varying the frequency chirp of the OFDR test light signal. In the case of coded or correlation OTDR, it is the bit rate of the optical test pattern that determines the spatial resolution of the measurement.

BRIEF DESCRIPTION OF THE DRAWINGS

FIG. 3A and FIG. 3B are referred to together as FIG. 3 which is a flow chart illustrating an example of bi-directional analysis in accordance with the bi-directional OTDR method of FIG. 2;

It will be noted that throughout the appended drawings, like features are identified by like reference numerals.

DETAILED DESCRIPTION

Figure 1:
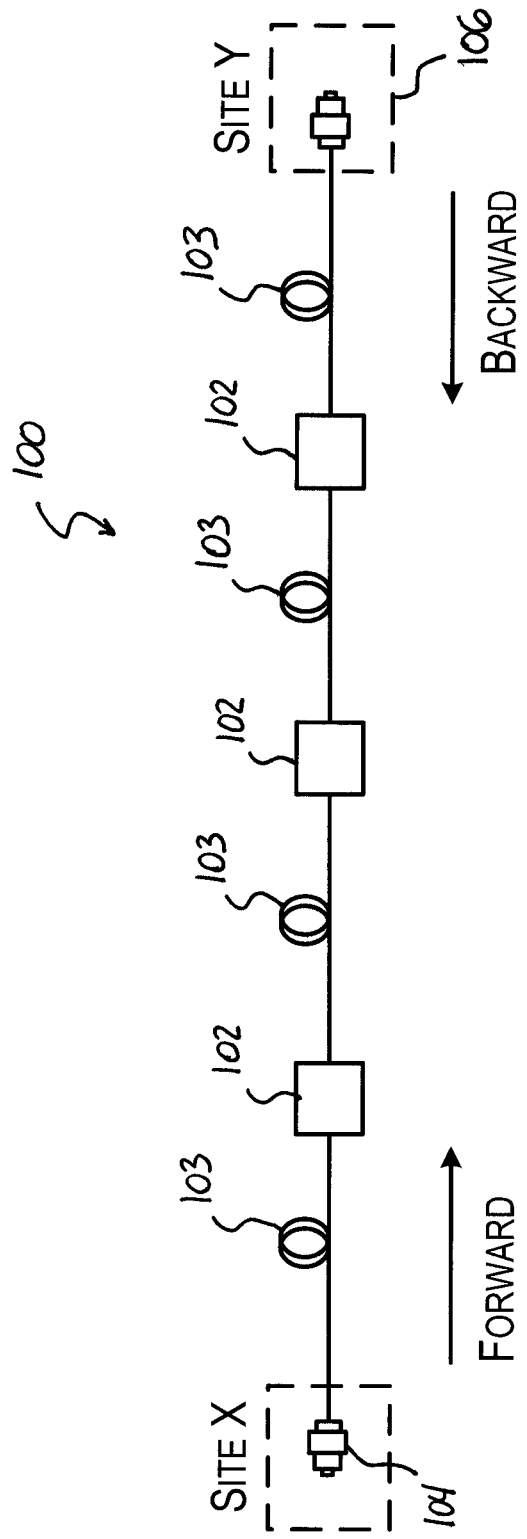
FIG. 1 is a block diagram illustrating an example of an optical fiber link to be characterized in accordance with one embodiment.

Referring to FIG. 1, there are provided bi-directional multi-pulsewidth Optical Time-Domain Reflectometric (OTDR) methods and systems for characterizing an optical fiber link 100 between physical sites X and Y using a bi-directional OTDR analysis.

OTDR is a diagnostic technique for optical fiber networks where a light pulse is launched in an optical fiber link and the returning light, arising from backscattering and reflections along the fiber link, is detected and analyzed. Various events 102 along the fiber link 100, which delimit optical fiber segments 103, can be detected and characterized through a proper analysis of the returning light in the time domain. In order to perform a bi-directional characterization, single-end OTDR measurements should be made from both forward and backward directions on the fiber link 100. To perform the forward-direction characterization, an OTDR system (not shown) is connected to the first end 104 of the fiber link 100 (located at site X) and multi-pulsewidth OTDR light acquisitions are performed. As known in the art, the light acquisitions are typically performed with launch and receive cables respectively connected to the first 104 and the second 106 end of the fiber link 100 in order to provide total loss characterization of the fiber link 100. A similar measurement is then performed in the backward direction by connecting the same or another OTDR system (not shown) to the second end 106 of the fiber link (located at site Y), as well as similar launch and receive cables, and performing multi-pulsewidth OTDR light acquisitions.

Proper analysis of the forward- and backward-direction multi-pulsewidth light acquisitions allows identifying and characterizing the events 102 and the optical fiber segments 103 along the fiber link 100. The events 102 are typically characterized in terms of location, insertion loss and reflectance parameters while optical fiber segments 104 may be characterized in terms of an attenuation parameter.

Figure 2:
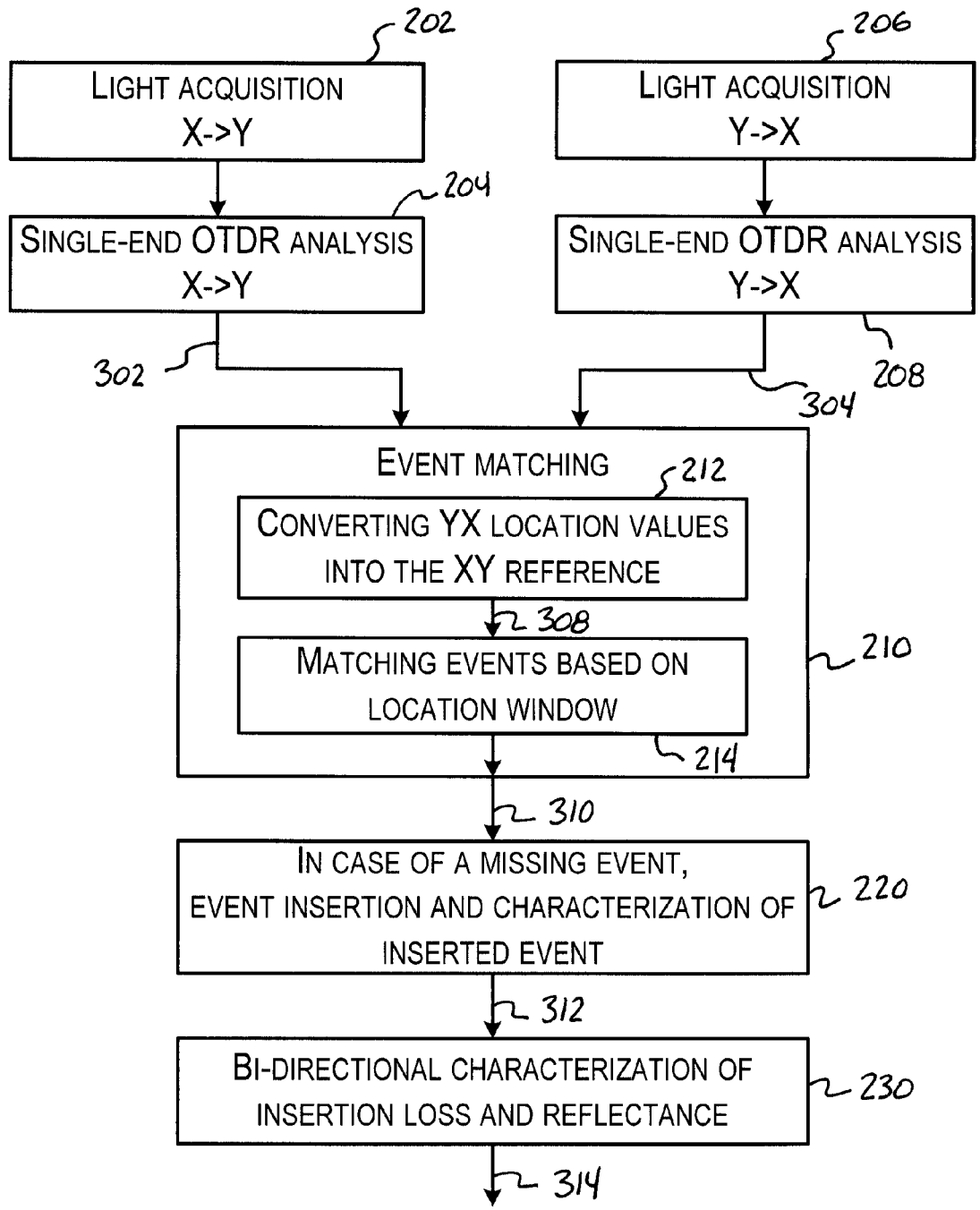
FIG. 2 is a flow chart illustrating a bi-directional OTDR method for characterizing an optical fiber link in accordance with one embodiment.

Referring to FIGS. 2 and 3, there is provided a bi-directional OTDR method for characterizing an optical fiber link such as the fiber link 100 of FIG. 1. In order to perform a bi-directional analysis, single-end multi-pulsewidth OTDR measurements and analysis are first performed for both forward (steps 202 and 204) and backward directions (steps 206, 208). A bi-directional analysis of the single-end measurements is then conducted in steps 210, 220 and 230.

Of course, in order to perform both single-end OTDR measurements, two OTDR acquisition devices, one at each end of the fiber link, may be used or the same OTDR acquisition device may be moved from one site to the other between the measurements.

In step 202, a plurality of forward-direction light acquisitions are performed from the first end X of the optical fiber link. Each light acquisition is understood to refer to the actions of propagating a test light signal comprising one or more test light pulses having the same pulsewidth (i.e. corresponding to the same spatial resolution) in the optical fiber link, from site X, and detecting corresponding return light signal from the optical fiber link as a function of time. A test light-pulse signal travelling along the optical fiber link will return towards its point of origin either through (distributed) backscattering or (localized) reflections. The acquired power level of the return light signal as a function of time is referred to as the OTDR trace, where the time scale is representative of distance between the OTDR acquisition device and a point along the fiber link. Light acquisitions are repeated with varied pulsewidth values to provide a multi-pulsewidth OTDR measurement comprising a separate OTDR trace for each test pulsewidth.

One skilled in the art will readily understand that in the context of OTDR methods and systems, each light acquisition generally involves propagating a large number of substantially identical light pulses in the optical fiber link and averaging the results. In this case, the result obtained from averaging will herein be referred to as an OTDR trace. It will also be understood that other factors may need to be controlled during the light acquisitions or from one light acquisition to the next, such as gain settings, pulse power, etc. as is well known to those skilled in the art.

"Backscattering" refers to Rayleigh scattering occurring from the interaction of the travelling light with the optical fiber media all along the fiber link, resulting in a generally sloped background light (in logarithmic units, i.e. dB, on the ordinate) on the OTDR trace, whose intensity disappears at the end of the range of the travelling pulse. "Events" along the fiber will generally result in a more localized drop of the backscattered light on the OTDR trace, which is attributable to a localized loss, and/or in a localized reflection peak. It will be understood that an "event" characterized by the OTDR method described herein may be generated by any perturbation along the fiber link which affects the returning light. Typically, an event may be generated by an optical fiber splice along the fiber link, which is characterized by a localized loss with little or no reflection. Mating connectors can also generate events that typically present reflectance, although these may be impossible to detect in some instances. OTDR methods and systems may also provide for the identification of events such as a fiber breakage, characterized by substantial localized loss and, frequently, a concomitant reflection peak, as well as loss resulting from a bend in the fiber. Finally, any other component along the fiber link may also be manifest as an "event" generating localized loss.

In step 204, the multi-pulsewidth OTDR measurement is analyzed to identify events along the fiber link and characterize the identified events. Identification of the events may be made according to their locations, i.e. the distance along the optical fiber link at which the event is identified. It is common in the art to identify events on an OTDR trace by analyzing the OTDR trace to identify a localized drop in the backreflected/backscattered light and/or a reflectance peak. The presence of one or the other will generally be interpreted as an event.

It is also common in the art to characterize events along an optical fiber link by attributing values to three different parameters: the location of the event along the optical fiber link, the insertion loss associated with the event and the reflectance at the event (when present). Depending on the circumstances, one or a combination of a plurality of these parameters may be evaluated for a given event. In the embodiment described herein, all three parameters are being evaluated in step 204 for each identified event. The result of this analysis is a list of events 302 (see FIG. 3) comprising values of location, as well as of insertion loss and reflectance associated with each event. It is however noted that, in other embodiments, a list of events characterized by their location only is generated at this step, whereas insertion loss and reflectance values are evaluated in the following bi-directional analysis.

Knowing the specific acquisition conditions, the value of insertion loss corresponding to the event may be derived from the associated drop in the backscattered light, between respective points spanning a discernible spatial extent just "upstream" and "downstream" of the event on the OTDR trace. Also with knowledge of the specific acquisition conditions, including the pulsewidth of the test light pulse used for the acquisition, the value of the reflectance corresponding to the event may be derived from the height of the associated reflection peak with respect to the level of backscattered light.

Accordingly, a proper analysis of the multi-pulsewidth OTDR measurement allows identification of events along the fiber link and values of parameters characterizing each identified event (location, insertion loss and reflectance) are derived using the multi-pulsewidth OTDR traces.

In some embodiments, the optical fiber link is virtually split in length such that each portion of the fiber link is characterized using a corresponding acquisition performed with a given pulsewidth. Shorter pulses are used to characterize the most proximal portion, i.e. the end of the link under test adjacent the OTDR. A second acquisition with a longer pulse is then performed, to characterize the portion of the optical link that is farther away. This process of acquisition with a progressively longer pulse is repeated until the end of the link is covered. It is to be noted that the number of pulse parameters used depends on the link under test (e.g. only one pulsewidth for a short link, many pulsewidths for a long link). As a result, parameters of at least some events are derived from an OTDR trace corresponding to one pulsewidth and parameters of some other events are derived from another OTDR trace corresponding to a different pulsewidth. The successive acquisitions can be performed in a dynamic manner, i.e. optimized during measurement of the particular link under test, or based on a predetermined routine that always tests with a given sequence of pulsewidths. In practice, differences in gain settings, filtering, bandwidth, etc. may occur for each acquisition.

In accordance with some other embodiments, an optimum pulse for characterizing an event is selected independently for each parameter to be characterized such that the characterization of a single event may employ a combination of a plurality of acquisitions performed with different pulsewidths. For example, a first acquisition performed with one pulsewidth may be used to characterize the event location and a second acquisition performed with another pulsewidth may be used to characterize the insertion loss or the reflectance associated with the same event.

Hence, in accordance with such embodiments, values of parameters of each event identified along the optical fiber link are derived from a proper analysis of the OTDR traces such that the optimum OTDR trace to be used for deriving each parameter of each event is selected independently. Accordingly, for each event and for each parameter to be characterized, the optimum OTDR trace to be used for deriving the parameter is selected. Hence, instead of selecting the optimum pulse for each event, the method and system combine the OTDR traces obtained with multiple pulsewidths to extract as much information as feasible about each event.

In some embodiments, the selection may be based on quality factors associated to each OTDR trace for a given parameter of a given event. The OTDR method may therefore involve associating a "quality factor" to the parameters being evaluated for each of the OTDR traces. This quality factor can allow the comparison of the results from the different light acquisitions. Quality factors are usually based on one or many of the following considerations: pulsewidth, signal-to-noise ratio (SNR), sampling resolution, etc. Quality factors can also vary based on the type of event that is looked at (reflective vs. non-reflective, small vs. large loss).

Some simple quality factors are given here as illustrative examples only:

Location: The acquisition that provides the best sampling resolution (i.e. corresponding to the smallest physical extent) with a signal-to-noise ratio (SNR) above a predetermined location threshold, for example 8 dB, is used. In general, the best sampling resolutions are associated with short-pulse acquisitions. Alternatively, the acquisition that provides the smallest uncertainty associated with the location parameter is used. Uncertainty is typically given as a function of the pulsewidth corresponding to the acquisition but other factors, such as the reflectance peak associated with the event in this acquisition and the signal-to-noise ratio may also be taken into account in deriving the uncertainty;

Insertion Loss: The shortest pulse acquisition that provides a signal-to-noise ratio (SNR) above a predetermined loss threshold is used (e.g. 10 dB);

Reflectance: The shortest pulse acquisition that provides a signal-to-noise ratio (SNR) above a predetermined reflectance threshold is used (e.g. 7 dB).

In general, for reflective events, the SNR thresholds for location and reflectance are of a smaller value than the threshold for loss. The chosen threshold values for SNR depend on the application and on the accuracy that is required. These examples of quality factors are given for illustrative purposes and are not to be considered limitative to the scope of the invention.

It is noted that, in some embodiments, a combination of OTDR traces may also be used to characterize a single parameter of an event.

The reader is referred to International Publication No. WO 2011/147030 A1 (PERRON et al), which is hereby incorporated by reference, for further implementation details of specific embodiments of multi-pulsewidth OTDR methods and systems.

As a result of step 204, the list of identified events comprising, in this embodiment, the derived parameters characterizing the events may be saved in a single-end OTDR measurement file (XY) or in memory in the form of a table for example. The file or table comprises the list of events as well the OTDR traces as acquired in step 202. The list of events may also be displayed on screen.

In step 206, a plurality of backward-direction light acquisitions are performed from the second end Y of the optical fiber link to provide a multi-pulsewidth OTDR measurement. In step 208, the multi-pulsewidth OTDR measurement obtained in step 206 is analyzed to identify events along the fiber link and characterize the identified events. Steps 206 and 208 are respectively performed similarly to steps 202 and 204, and will therefore not be repeatedly described.

The result of step 208 is a single-end OTDR measurement file (YX) or table comprising the list of events and, in this embodiment, the derived parameters characterizing the events, as well the OTDR traces as acquired in step 206. The list of events may also be displayed on screen.

FIG. 3 shows examples of lists of events 302, 304 as obtained respectively in step 204 from the forward-direction analysis and in step 208 from the backward-direction analysis. List of events 302 typically enumerates events identified in the forward-direction analysis, as defined by their location, and includes the associated insertion loss and reflectance parameters; and list of events 304 lists events identified the backward-direction analysis also defined by their location, and also includes the associated insertion loss and reflectance parameters. For purpose of illustration, the pulsewidth corresponding to the OTDR trace used for characterizing at least the location of each event is also included in lists of events 302 and 304. As explained hereinabove, in some embodiments, the OTDR trace used for characterizing the insertion loss and/or the reflectance of an event may be different from the one used for characterizing the location.

The pulsewidth is included in lists of events 302 and 304 to illustrate the fact that the resolution of the single-end OTDR measurements decreases with distance along the optical fiber link to be characterized. However, this information is not necessarily included the single-end OTDR measurement files or tables.

The next steps (210 to 230) describe more specifically the bi-directional analysis of the single-end measurements obtained in steps 202 to 208. The bi-directional analysis typically receives the single-end OTDR measurement files or tables generated in steps 204 and 208.

In step 210, location of events identified in step 204 and available in list of events 302 are matched with location of events identified in step 208 and available in list of events 304 to create a consolidated list of events 310 comprising events of both list 302 and list 304. In order to match the events, values of location of one of the lists 302 and 304 need to be converted into the reference of the other. By convention, it is here chosen to convert backward-direction (YX) location values into forward-direction (XY) location values.

Accordingly, in step 212, backward-direction (YX) location values are converted into the forward-direction (XY) reference. The conversion is performed as follows:

$$XY\_location_{YX} = Total\_length - YX\_location_{YX}$$

where YX_location$_{YX}$ is the backward-direction location value as of list 304, XY_location$_{YX}$ is the converted backward-direction location value into the forward-direction reference and Total_length is the total length of the fiber link under test, which is 60 000 m in the example of FIG. 3. Converted location values corresponding to the example of FIG. 3 are shown in list of events 308. It is noted that in embodiments employing launch and receive cables, lengths of such cables need to be taken into account in the calculation of location values. It is noted that in the example of FIG. 3, the launch and receive cable lengths are removed up front from location values given in lists 302 and 304. If this is not the case, the conversion should be calculated as follows:

$$XY\_location_{YX} = Total\_length' - Receive\_length\_YX - YX\_location_{YX}$$

$$XY\_location_{XY}' = XY\_location_{XY} - Launch\_length\_XY$$

where YX_location$_{YX}$ is the backward-direction location value including the launch cable, XY_location$_{YX}$ is the converted backward-direction location value into the forward-direction reference, Total_length' is total length of the fiber link under test including the launch and receive cables, Receive_length_YX is the length of the receive cable used for the backward-direction acquisitions, XY_location$_{XY}$ is the forward-direction location value including the launch cable, Launch_length_XY is the length of the launch cable used for the backward-direction acquisitions and XY_location$_{XY}$' is the forward-direction location value with the launch cable length being mathematically removed.

In step 214, location of events of list 306 are matched with location of events in list 308 to create a consolidated list of events 310. It will be understood that location values as characterized in steps 204 and 208 are subject to a level of uncertainty related to the pulsewidth corresponding to the OTDR trace used for deriving the value of the location parameter. Accordingly, in order for events to be matched, the location values need not to be exactly the same in the forward- and backward-direction characterizations. For each direction, the event matching algorithm may therefore associate a location window to each event, wherein the width of the location window corresponds to twice the uncertainty of the location value associated with the event in this direction. The uncertainty is given as a function of the pulsewidth corresponding to the OTDR trace used for deriving the value of the location parameter but other factors, such as the reflectance associated with the event, the signal-to-noise ratio, the type of event (reflective or not), the uncertainty associated with the characterization of the total length of the optical fiber link (which is used in calculating location values in step 212), may also be taken into account in deriving the uncertainty. Events are matched if forward and backward location windows overlap.

The event matching procedure is illustrated in FIG. 3 by lines 320 drawn between lists 306 and 308. It will be understood that because of differences in resolution (which are related to the pulsewidth), closely spaced events that may appear as distinct in the forward-direction list of events may appear as merged together in the backward-direction list, or vice-versa. In this case, two or more distinct (high-resolution) events of one list may be matched to a single (lower-resolution) event in the other list. In the consolidated list of events 310, the distinct events will hence be shown as distinct but nevertheless will be grouped together. Examples of merged events are present in the example of FIG. 3 at positions 5000 m and 5100 m and at positions 53 900 m and 54 000 m.

Other situations may occur where one or more events identified in the backward-direction analysis and present in the backward-direction list of events, are missing from the list of events obtained from the forward-direction analysis, or vice-versa. In this case, this event is still included the consolidated list of events 310. An example of such a partly missing event is present in the example of FIG. 3 at position 43 000 m.

Step 220 applies in such cases of partly missing events. In order to properly perform a bi-directional characterization of a partly missing event, the event needs to be characterized in both directions. Accordingly, an event may be inserted in the direction where the event is missing even if it was not initially identified in this direction. Single-end characterization of the event in this direction may then forced and values of insertion loss and reflectance parameters may be derived using the location given by the event as identified in the other direction. The selection of the OTDR trace or traces to be used for deriving the insertion loss and the reflectance parameter may again be performed as described hereinabove with reference to step 204. The consolidated list of event is then updated with these values. The updated consolidated list of events is shown as 312 in FIG. 3. Of course, it is highly probable that the event will exhibit very low insertion loss and reflectance values because it would otherwise have been initially identified in the single-end analysis.

In step 230, the bi-directional characterization of insertion loss and reflectance of the events of the consolidated list 312 is then being derived to provide a bi-directional list of events 314. The bi-directional insertion loss of an event is typically given by the average of the two single-end insertion loss values whereas the bi-directional reflectance of an event is given by the maximum of the two single-end reflectance values. The bi-directional location of an event may be given by the single-end location having the smallest associated uncertainty. In other words, each single-end location is associated with a quality factor that is for instance based on the associated uncertainty. The single-end location to be used to derive the bi-directional location may then be selected by comparing the quality factors.

As exemplified in FIG. 3, values of location, insertion loss and reflectance parameters may consequently be derived from a light acquisition performed in the forward-direction with a first pulsewidth and a light acquisition performed in the backward-direction with a second pulsewidth, different from the first. For example, in FIG. 3, single-end location, insertion loss and reflectance of the event located at position 31 000 m is derived in the forward-direction using the acquisition performed with a 1000-ns pulsewidth and is derived in the backward-direction using the acquisition performed with a 10-ns pulsewidth. The bi-directional location parameter is given by the backward-direction location parameter (characterized with a 10-ns pulsewidth). The bi-directional insertion loss parameter is given by the average of the forward- and the backward single-end insertion loss parameters (characterized respectively with a 1000-ns and a 10-ns pulsewidth). The bi-directional reflectance parameter is given by the maximum of the forward- and the backward single-end reflectance parameters (characterized respectively with a 1000-ns and a 10-ns pulsewidth).

As also exemplified in FIG. 3, the value of the bi-directional insertion loss parameter of the event at position 43 000 m, which was not initially identified in the forward-direction single-end analysis, is derived from light acquisitions performed in both the forward-direction and the backward-direction. A bi-directional characterization is thus obtained.

It should be noted that there may be some cases where, in step 220, it is not possible to characterize the event in the direction where it was initially missing because no OTDR trace provides sufficient signal-to-noise ratio for such characterization. In this case, a bi-directional characterization of this event may not be possible. The event may then be flagged as not being characterized bi-directionally and a warning or error message may be generated accordingly.

In the case of closely spaced events that were distinguished in one single-end analysis but merged in the other, these events are presented as distinct in the bi-directional list of events 314 but they are grouped together because it is not possible to derive a true value of bi-directional insertion loss for each of these events. The bi-directional insertion loss is only available as a group. In this case, the value of the bi-directional insertion loss parameter of the group is calculated as the average of: the sum of the insertion losses of the distinct events in one direction, and the global insertion loss of the group in the other direction.

Pass/fail criteria may then be applied to the parameters as obtained from the bi-directional analysis. Pass/fail criteria may be applied to both the insertion loss parameter and the reflectance parameter. Events of the bi-directional list of events 314 that present a bi-directional insertion loss that is above the pass/fail insertion loss threshold will be flagged as failed. Similarly, events of the bi-directional list of events 314 that present a bi-directional reflectance that is above the pass/fail reflectance threshold will also be flagged as failed.

Grouped events represent a special case in that the bi-directional insertion loss is not available for the individual events of a group. However, the events not only exist as a group but also as individual events in the bi-directional list of events 314. This information may be used to apply the pass/fail criterion in a special manner. For example, the insertion loss threshold may then be applied to the global bi-directional insertion loss of the group but the threshold would then be multiplied by the number of individual events in the group. Using this method, events that are in fact acceptable according to the pass/fail criterion and that would be flagged as "fail" in a single-end analysis, are advantageously flagged as "pass" in the bi-directional analysis.

An example of such events is present in the example of FIG. 3 at positions 5000 m and 5100 m. Those events are grouped in the bi-directional analysis. Considering an insertion loss threshold of 1.0 dB, the events that appear as merged in the backward-directional analysis would have been flagged as fail because the insertion loss of the merged event is 1.5 dB, which is above the threshold. With the bi-directional analysis, the group of two events has a bi-directional insertion loss of 1.25 dB, which would also be above the threshold. However, because the group includes two events, the threshold is multiplied by two and the bi-directional insertion loss of 1.25 dB is then below the threshold and the group is flagged as "pass".

It should be noted that it is also common in the art of OTDR measurement to characterize optical fiber segments between identified events by attributing a value of an attenuation parameter thereto. It will be readily understood that the bi-directional OTDR method described herein may also be applied to characterize attenuation of optical fiber segments between the identified events. In this case, single-end analysis provides a forward- and a backward-direction attenuation value for each optical fiber segment. The bi-directional attenuation value of an event may then be obtained by the average of the forward- and backward-direction attenuation values for this event.

It is noted that in some embodiments, a plurality of light acquisitions is performed with respective test light pulses having mutually different wavelengths in order to provide a multi-wavelength characterization of the fiber link under test. The bi-directional OTDR method of FIG. 2 may then be applied for each of the individual wavelengths.

In this case, situations may occur where one or more events identified in the forward- or backward-direction analysis at a first wavelength are missing from the list of events obtained from the forward- and backward-direction analysis at a second wavelength. In this case, the lists of events may be further consolidated such that this event may be inserted similarly as described above with reference to step 220. The characterization of the event at the second wavelength is then forced such that values of insertion loss and reflectance parameters are derived using light acquisitions performed at the second wavelength. The location parameter associated with the event may however be characterized at the first wavelength where the event was identified.

The same may apply to events that are merged together at one wavelength but distinct at another.

It is noted that bi-directional analysis may not be possible for a particular wavelength if acquisitions were not performed from both ends at this wavelength. In this case, only a single-end result may be available for this wavelength. Nevertheless, characterization at such a wavelength may still benefit from acquisitions performed from the other end, at one or more other wavelengths. For example, in a single-end analysis performed at a first wavelength (for which light acquisitions were only performed in one direction), two or more closely spaced events may appear as merged, while they appear distinct (grouped or not) in a list of events obtained from a single-end or bi-directional analysis at the second wavelength. A consolidation of the list of events at the first wavelength with the list of events at the second wavelength will resolve the individual events in a group. At the first wavelength, insertion loss will only be available for the group and not for the individual events. However, in the wavelength consolidated list of events, the events not only exist as a group but also as individual events. This information may be used to apply the pass/fail criterion to the insertion loss of the group at the first wavelength as explained hereinabove, i.e. the insertion loss threshold is applied to the global insertion loss of the group at the first wavelength but the threshold is multiplied by the number of individual events in the group. Using this method, the number of events that are wrongly flagged as "fail" may be reduced.

Figure 4:
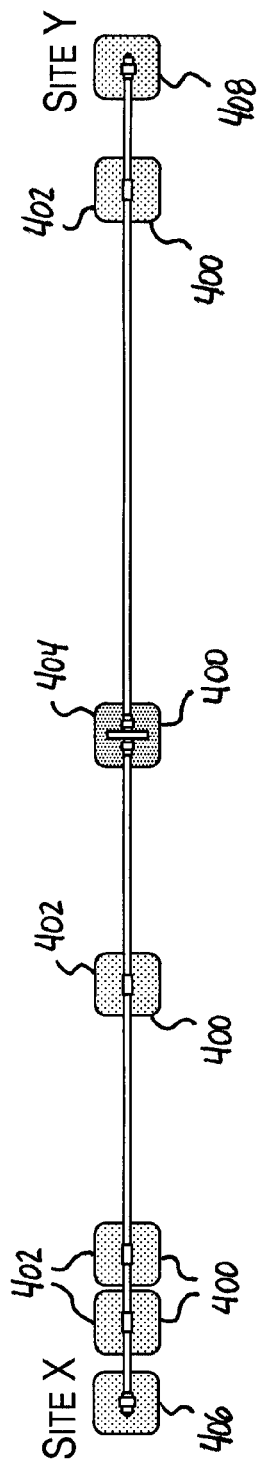
FIG. 4 is a graphical representation showing a link element view corresponding to the forward-direction analysis illustrated in FIG. 3.
Figure 5:
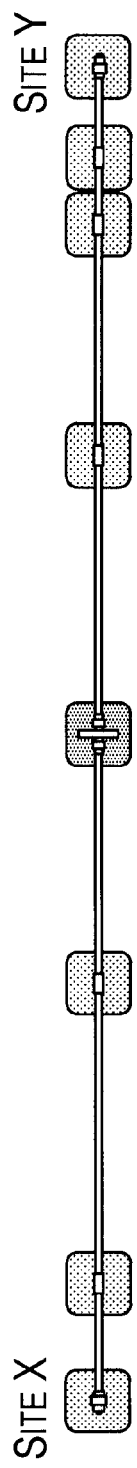
FIG. 5 is a graphical representation showing a link element view corresponding to the backward-direction analysis illustrated in FIG. 3.
Figure 6:
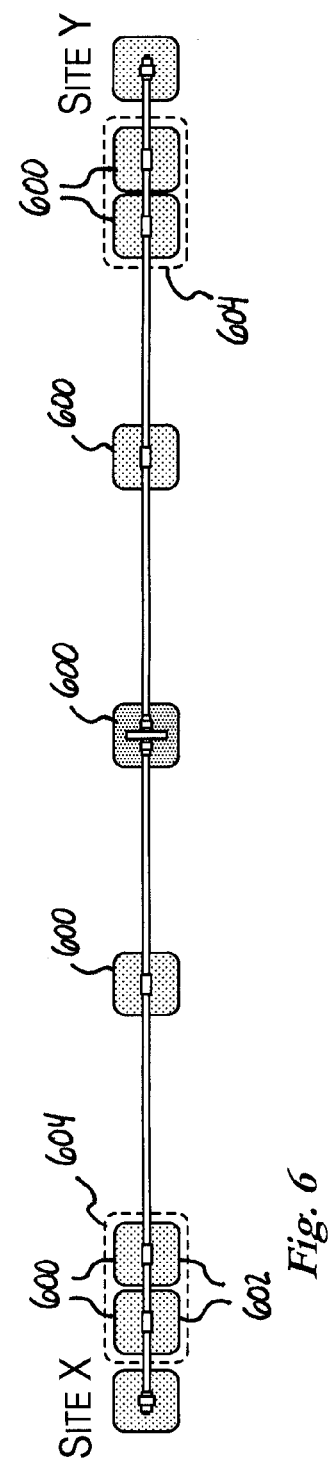
FIG. 6 is a graphical representation showing a link element view corresponding to the bi-directional analysis illustrated in FIG. 3.

The results obtained from the bi-directional OTDR method of FIG. 2 may be presented as a table or graphically. FIGS. 4, 5 and 6 show graphical representations of the fiber link under test respectively corresponding to the result of the forward-direction, the backward-direction and the bi-directional analysis corresponding to the example of FIG. 3. This type of graphical representation is referred to as a "link element view". Such link element view may be displayed on screen or otherwise be made available to the user. In the link element view of FIGS. 4 and 5, each event of a list of events is represented by an element box 400 graphically depicted as an icon selected from a number of visually-distinct predefined icons which image represent various types of events that may be present on an optical fiber link such as an optical fiber splice 402, a mating connector 404, an input connector 406, an output connector 408, etc. The appropriate icon used to represent a given event is generally selected according to the type of event identified as per the characterized insertion loss and reflectance of the event. The element boxes 400 are connected graphically by optical fiber segments. The element boxes 400 are typically positioned on the link element view according to the location of the underlying event along the characterized fiber link. The positioning along the link element view may be made to scale or not. In some embodiments, a special color, such as red, or any other suitable visual characteristic, may be assigned to an element box 400 associated with an event having a reflectance or an insertion loss exceeding the pass/fail threshold.

FIG. 6 shows a link element view 600 corresponding to the bi-directional analysis, where each event of the bi-directional list of events is represented by an element box 600. An element box 604 is also specifically defined for each group of events in the bi-directional list of events 314. However, element box 604 has a different graphical representation, in this case a square drawn around the grouped events. Link element view 600 is based on the bi-directional list of events 314 which is a result of the consolidation of the forward- and backward-direction list of events. Each element box 600 comprises data obtained from the forward- and backward-analysis and from the bi-directional analysis. In a user interface, the corresponding data may be accessed by selecting a specific element box 600. Data associated with the corresponding event is then displayed to the user. It should be noted that, in the case of grouped events, the corresponding individual element boxes 602 contain single-end parameters only, while the element box 604 of the group contains the bi-directional parameters for the group.

It is noted that the results obtained from the bi-directional OTDR method of FIG. 2 may be also presented graphically as loss and reflectance profile views such as described in U.S. provisional application No. 61/730,610, hereby incorporated by reference.

Figure 7:
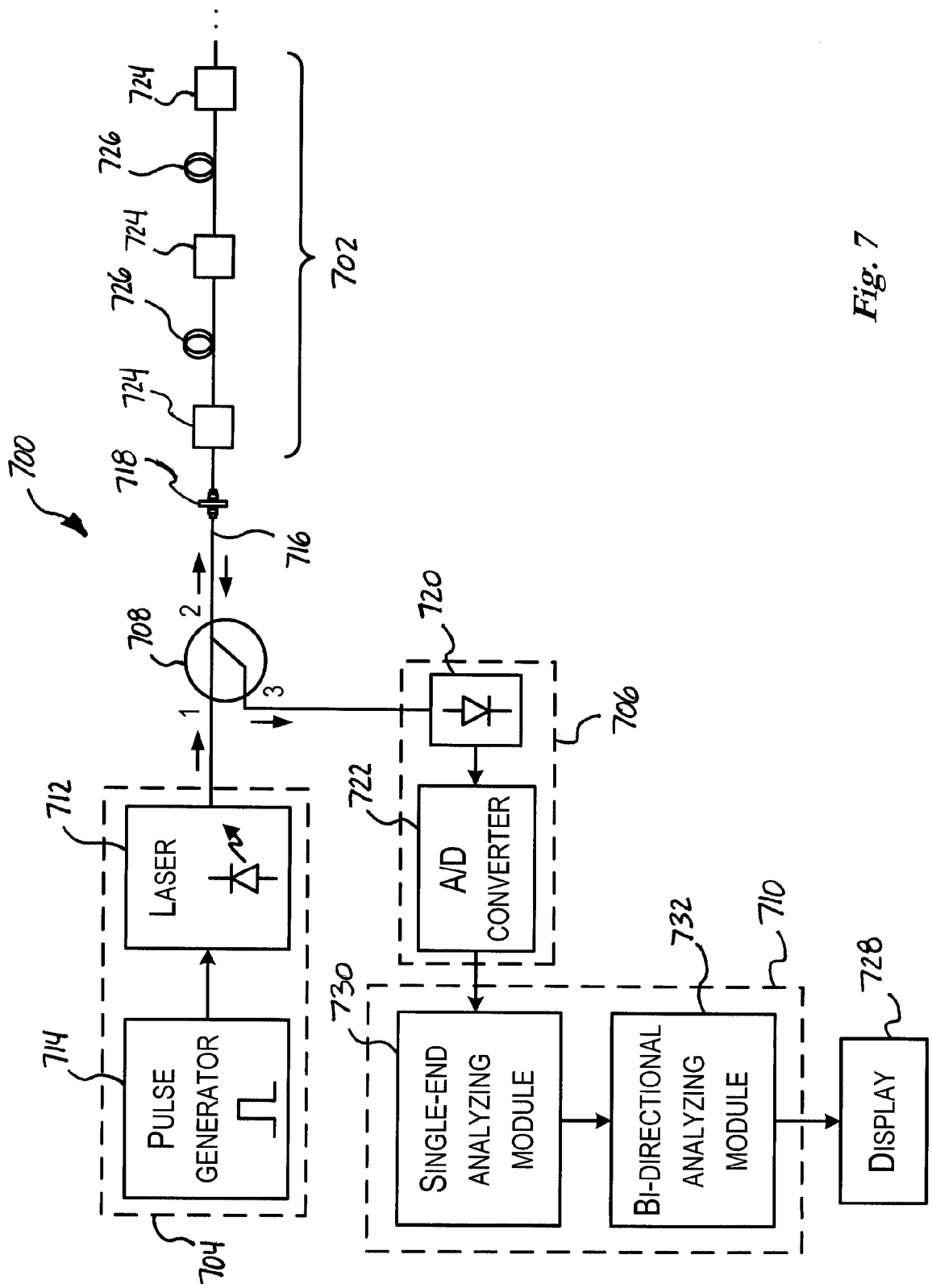
FIG. 7 is a block diagram of a bi-directional OTDR system in accordance with one embodiment.

FIG. 7 shows an example of an OTDR system 700 that may be used for performing bi-directional OTDR measurements and bi-directional OTDR methods as described herein, wherein FIG. 7 also shows an optical fiber link under test 702 that is connected to the OTDR system 700 for OTDR measurements to be performed from one end. In order to perform OTDR measurements in the other direction, the OTDR system 700 or OTDR acquisition device, in this case a portable one, may be disconnected and moved to the other end. Otherwise, another OTDR system 700 or OTDR acquisition device may be used at the other end.

The OTDR system 700 comprises a light generating assembly 704, a detection assembly 706, a directional coupler 708 and an analyzing module 710. The light generating assembly 704, the detection assembly 706 and the directional coupler 708 are generally embodied in an OTDR acquisition device (not shown), while the analyzing module 710 may be either be integral, partially external or totally external to the OTDR acquisition device. The light generating assembly 704 is here embodied by a laser 712 driven by a pulse generator 714 to generate test light pulses having desired characteristics. As known in the art, the light generating assembly 704 is adapted to generate test light pulses of varied pulsewidths and optical power through a proper control of the pattern produced by the pulse generator 714. One skilled in the art will understand that it may be beneficial or required by the application to perform OTDR measurements at various different wavelengths. For this purpose, in some embodiments, the light generating assembly 704 is adapted to generate test light pulses having varied wavelengths by employing a laser 712 that is tunable for example. It will be understood that the light generating assembly 704 may combine both pulsewidth and wavelength controlling capabilities. Of course, different and/or additional components may be provided in the light generating assembly, such as modulators, lenses, mirrors, optical filters, wavelength selectors and the like.

The light generating assembly 704 is coupled to the optical fiber link under test 702 through a directional coupler 708, such as a circulator, having three or more ports. The first port is connected to the light generating assembly 704 to receive the test light pulses therefrom. The second port is connected to the output 716 of the OTDR system 700 which in turn is connected to the optical fiber link 702 typically through an optical connector 718. The third port is connected to the detecting module 706. The connections are such that test light pulses generated by the light generating assembly 704 are coupled to the optical fiber link 702 and that return light arising from backscattering and reflections along the fiber link is coupled to the detection assembly 706.

The detection assembly 706 comprises a light detector 720, for example an avalanche photodiode, which detects the return light signal corresponding to each test light pulse, and a converter 722 to convert the electrical signal proportional to the detected return light from analog to digital in order to allow processing by the OTDR trace analyzing module 710. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. An OTDR trace nominally corresponds to a single test light pulse but may also be obtained from averaging multiple acquisitions performed under the same conditions. Of course, the OTDR system 700 may also be used to perform multiple acquisitions with varied pulsewidths to obtain multi-pulsewidth OTDR traces. The thereby obtained OTDR traces will be typically stored in memory within the analyzing module 710 for further processing.

The analyzing module 710 may be embodied by hardware and software and, as mentioned hereinabove, may be integral, partially external or totally external to the OTDR acquisition device used to perform the acquisitions. The analyzing module 710 performs the calculations necessary to characterize the events 724 along the optical fiber link 702. In the illustrated embodiment, the hardware and software within the analyzing module 710 are also used to control the acquisition conditions for each light acquisition, by controlling the light generating assembly 704 to generate test light pulses having variable pulsewidths, wavelengths and/or optical power. It will however be understood that the control of the light generating assembly 704 may also be separate from the analyzing module 710.

The optical fiber link 702 typically comprises one or more events 724 located at undetermined positions along the fiber link 102 and delimiting optical fiber segments 726. The purpose of the analyzing module 710 is to identify the events 724 and characterize the events 724 and the optical fiber segments 726 along the fiber link 720 through analysis of one or more OTDR traces as described herein above. The analyzing module 710 typically comprises a single-end analyzing module 730 and a bi-directional analyzing module 732. The single-end analyzing module 730 typically first performs single-end analysis (step 204/208 of FIG. 2) of the OTDR traces. Events 724 along the fiber link 720 are identified and a list of events 302/304 (see FIG. 3) is created. The single-end analyzing module 730 typically stores the characterization result and the OTDR traces as a single-end OTDR measurement file or table. The bi-directional analyzing module 732 then performs bi-directional analysis (steps 210, 220 and 230 of FIG. 2) according to the above description, based for example on previously generated and stored single-end OTDR measurement files. In this regard, a user interface may allow the user to select forward- and backward-direction OTDR measurement files or tables to be combined in a bi-directional analysis as described hereinabove. The events of the forward-direction list of events are matched with events of the backward-direction list of events and bi-directional insertion losses and reflectances may be calculated for events of the list, using single-end insertion losses and reflectances values stored in the single-end OTDR measurement files or tables.

In one embodiment, the bi-directional analyzing module 732 is provided apart from the OTDR acquisition device and receive single-end OTDR measurement files as generated by the single-end analyzing module 730 of the OTDR acquisition device. Such a bi-directional analysis module may be provided, for example, on a separate computer device or in a client-server or cloud-based software. A user interface of the bi-directional analyzing module may then allow the user to select forward- and backward-direction OTDR measurement files to be combined in a bi-directional analysis as described hereinabove.

Single-end and bi-directional analysis results may saved in memory as a file or may be graphical displayed on screen, printed or the like in the form of an event table, a graphical link element view and/or a loss and reflectance profile view, or in any other form. In the illustrated example of an OTDR system 700, the results are being shown on a display 728 which may either be integral or external to the OTDR acquisition device.

The optical fiber link under test may of course vary. For example, it may consist of a portion of an optical fiber telecommunication network such as a long-distance network, a Passive Optical Network (PON) or a Local Area Network (LAN). OTDR may, however, also be used in other contexts, such as optical sub-assembly production testing and the like. It will be further understood by one skilled in the art that while the examples below are given within the simplified context of a single fiber link, embodiments of the present invention may be adapted to point-to-multipoint networks, for example combined with High Reflectance Demarcation (HRD) techniques in Passive Optical Networks (PONs) (see, for example, patent publication no. US 2012/0045205 A1 to PERRON).

It will be readily understood that several variants of OTDR exist and may be devised, and that the use of this designation herein in not meant to limit the scope of the present specification to any of such variants. One skilled in the art will also understand that other optical components may be added to the OTDR system 700 for referencing purposes for example. A reference fiber may be added between the output of the OTDR acquisition device and the input of the optical fiber link under test. Also, in some embodiments (not illustrated), an internal reference reflector may be connected to a fourth port of the directional coupler 708. This reference reflector allows fluctuations in OTDR power levels due to aging or thermal effects to be tracked and compensated by performing normalization between acquisitions, thereby providing more accurate measurements (see U.S. Pat. No. 5,754,284 (LEBLANC et al.)).

Although illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated herein is thus only provided for efficiency of teaching the described embodiment.

The embodiments described above are intended to be exemplary only. The scope of the invention is therefore intended to be limited solely by the appended claims.

What is claimed is:

1. A bi-directional optical reflectometric method for characterizing an optical fiber link, the method comprising:

performing at least one forward-direction light acquisition from one end of the optical fiber link and performing at least one backward-direction light acquisition from the opposite end of the optical fiber link,
wherein each light acquisition is performed by propagating in the optical fiber link from the corresponding end, a test light signal corresponding to a given spatial resolution in the optical fiber link and detecting corresponding return light from the optical fiber link so as to obtain a reflectometric trace representing backscattered and reflected light as a function of distance on the optical fiber link, and
wherein said forward-direction light acquisition and backward-direction light acquisition are performed with mutually different spatial resolutions; and deriving a value of at least one parameter characterizing an event at a location along said optical fiber link at least using the forward-direction light acquisition and the backward-direction light acquisition performed with mutually different spatial resolutions.

2. The bi-directional reflectometric method as claimed in claim 1,
wherein each said light acquisition is an Optical Time-Domain Reflectometric (OTDR) light acquisition for which said test light signal comprises at least one test light pulse of a given pulsewidth corresponding to said given spatial resolution; and
wherein the pulsewidth corresponding to said forward-direction light acquisition and to said backward-direction light acquisition are mutually different.

3. The bi-directional OTDR method as claimed in claim 2, further comprising:
identifying events in said optical fiber link from return light of the at least one forward-direction light acquisition to create a list of events wherein each event of said list is characterized at least by a respective location along said optical fiber link;
identifying events in said optical fiber link from return light of the at least one backward-direction light acquisition to create a list of events wherein each event of said list is characterized at least by a respective location along said optical fiber link;
matching location of events in the forward-direction list with location of events in the backward-direction list to create a consolidated list of events comprising events of said forward-direction and said backward-direction list.

4. The bi-directional OTDR method as claimed in claim 2, wherein said at least one parameter characterizing said event comprises a bi-directional loss parameter and wherein a value of said bi-directional loss parameter is derived from the forward-direction acquisition obtained with a first pulsewidth and the backward-direction acquisition obtained with a second pulsewidth different from said first pulsewidth.

5. The bi-directional OTDR method as claimed in claim 2, a plurality of forward-direction light acquisitions are performed from said one end and a plurality of backward-direction light acquisitions are performed from said opposite end and wherein said plurality of forward-direction light acquisitions are performed with mutually different spatial resolutions and said plurality of backward-direction light acquisitions are performed with mutually different spatial resolutions.

6. The bi-directional OTDR method as claimed in claim 5, wherein said at least one parameter characterizing said event comprises a bi-directional loss parameter and wherein deriving a value of the bi-directional loss parameter characterizing an event comprises:
associating a quality factor to said loss parameter for each of the forward-direction light acquisitions and for each of the backward-direction light acquisitions;
comparing the quality factors associated with each of the forward-direction light acquisitions to select one of the forward-direction light acquisitions to use for computing a value of a forward-direction loss parameter;
comparing the quality factors associated with each of the backward-direction light acquisitions to select one of the backward-direction light acquisitions to use for computing a value of a backward-direction loss parameter;
computing the bi-directional loss parameter characterizing the one event based on the forward- and backward-direction loss parameters.

7. The bi-directional OTDR method as claimed in claim 5, further comprising:
deriving a value of at least another parameter characterizing said event using return light from a selected one of forward-direction light acquisitions and backward-direction light acquisitions.

8. The bi-directional OTDR method as claimed in claim 7, wherein deriving a value of a parameter characterizing an event comprises:
associating a quality factor to said parameter for each of the forward-direction light acquisitions and for each of the backward-direction light acquisitions;
comparing the quality factors associated with each of the forward-direction and backward-direction light acquisitions to select one of the forward-direction or backward-direction light acquisitions to use for computing the value of the parameter.

9. The bi-directional OTDR method as claimed in claim 3, wherein some events are merged together in one list of events but distinct in the other list of events and wherein said matching location of events matches said events as merged together in said one list with events as distinct in the other list to create the consolidated list.

10. The bi-directional OTDR method as claimed in claim 3, wherein:
at least one event is present in only one of said forward-direction and said backward-direction lists, said at least one event then being part of, said consolidated list of events; and
the method further comprises deriving a value of a bi-directional loss parameter characterizing said at least one event based on return light from the forward-direction acquisition and the backward-direction acquisitions.

11. The bi-directional OTDR method as claimed in claim 2, wherein a plurality of light acquisitions is performed with respective test light pulses having mutually different wavelengths.

12. The bi-directional OTDR method as claimed in claim 11, further comprising:
identifying events in said optical fiber link from return light of acquisitions performed at a first wavelength to create a first list of events wherein each event of said list is characterized at least by a location along said optical fiber link;
identifying events in said optical fiber link from return light of acquisitions performed at a second wavelength to create a second list of events wherein each event of said second list is characterized at least by a location along said optical fiber link; and
matching location of events in the first list with location of events in the second list to create a consolidated list of events comprising events of said first and said second list, wherein said matching location of events matches some events that are merged together in one list of events with events as distinct in the other list of events to create the consolidated list.

13. The bi-directional OTDR method as claimed in claim 11, further comprising:
identifying events in said optical fiber link from return light of acquisitions performed at a first wavelength to create a first list of events wherein each event of said first list is characterized at least by a location along said optical fiber link;

identifying events in said optical fiber link from return light of acquisitions performed at a second wavelength to create a second list of events wherein each event of said second list is characterized at least by a location along said optical fiber link; and deriving a value of a parameter characterizing, at said second wavelength, an event present in said first list but missing from the second list using return light from acquisitions performed at said second wavelength and the location of said event characterized at said first wavelength.

14. A link element view for graphically representing the results of a bi-directional optical time-domain reflectometric (OTDR) method on an optical fiber link having a first and a second end, the link element view comprising:

a plurality of element boxes each associated with an event along said optical fiber link and each graphically represented as one of a number of visually-distinct predefined icons; and wherein at least one of said element boxes comprises a value of at least one bi-directional parameter characterizing its associated event at least using a forward-direction light acquisition performed from the first end of the optical fiber link and a backward-direction light acquisition performed from the second end of the optical fiber link.

15. A bi-directional optical time-domain reflectometric (OTDR) method for characterizing an optical fiber link having a first and a second end, the method comprising:

performing at least one forward-direction light acquisition from the first end of the optical fiber link and performing at least one backward-direction light acquisition from the second end of the optical fiber link, wherein each light acquisition is performed by propagating in the optical fiber link from the corresponding end, at least one test light pulse of a given pulsewidth and detecting corresponding return light from the optical fiber link so as to obtain a reflectometric trace representing backscattered and reflected light as a function of a distance on the optical fiber link, and identifying events in said optical fiber link from return light of the at least one forward-direction light acquisition to create a list of events wherein each event of said list is characterized at least by a location along said optical fiber link;

identifying events in said optical fiber link from return light of the at least one backward-direction light acquisition to create a list of events wherein each event of said list is characterized at least by a location along said optical fiber link;

matching location of events in the forward-direction list with location of events in the backward-direction list to create a consolidated list of events comprising events of said forward-direction and said backward-direction list; and defining a plurality of element boxes each associated with one of said events of said consolidated list of events and each graphically represented as an icon selected from a number of visually-distinct predefined icons.

16. The bi-directional OTDR method as claimed in claim 15, wherein at least one of said element boxes comprises a value of at least one parameter characterizing its associated event at least using the forward-direction light acquisition performed from the first end of the optical fiber link and the backward-direction light acquisition performed from the second end of the optical fiber link.

17. The bi-directional OTDR method as claimed in claim 15, wherein the forward-direction light acquisition and the backward-direction light acquisition are performed with mutually different pulsewidths and wherein said method further comprises:

deriving a value of at least one parameter characterizing one of said events along said optical fiber link at least using the forward-direction light acquisition and the backward-direction light acquisition performed with mutually different pulsewidths.

* * * * *